US010599674B1

(12) United States Patent
Maru et al.

(10) Patent No.: US 10,599,674 B1
(45) Date of Patent: Mar. 24, 2020

(54) APPARATUS AND METHOD FOR REPLICATING DATA

(71) Applicant: West Corporation, Omaha, NE (US)

(72) Inventors: Jaikishan Maru, Mobile, AL (US); Mark J. Holmes, Mobile, AL (US)

(73) Assignee: West Corporation, Omaha, NE (US)

( * ) Notice: Subject to any disclaimer, the term of this patent is extended or adjusted under 35 U.S.C. 154(b) by 300 days.

(21) Appl. No.: 13/905,846

(22) Filed: May 30, 2013

(51) Int. Cl.
*G06F 16/27* (2019.01)

(52) U.S. Cl.
CPC .................. *G06F 16/275* (2019.01)

(58) Field of Classification Search
CPC .............. G06F 21/57; G06F 17/30581; G06F 17/30569; G06F 11/008; G06F 17/30454; G06F 17/30592; G06F 17/30595; G06F 17/30241; G06F 16/29; G06F 16/275
See application file for complete search history.

(56) References Cited

U.S. PATENT DOCUMENTS

| 8,406,096 | B1* | 3/2013 | Edling | G11B 15/689 360/69 |
| 9,652,516 | B1* | 5/2017 | Peters | G06F 16/284 |
| 2006/0020619 | A1* | 1/2006 | Netz | G06F 16/283 |
| 2009/0187602 | A1* | 7/2009 | Chen | G06F 17/30592 |
| 2010/0280990 | A1* | 11/2010 | Castellanos | G06F 16/283 707/602 |
| 2011/0302151 | A1* | 12/2011 | Abadi et al. | 707/714 |
| 2013/0086022 | A1* | 4/2013 | Black et al. | 707/705 |
| 2013/0117227 | A1* | 5/2013 | Kruglick | 707/626 |
| 2013/0173539 | A1* | 7/2013 | Gilder | G06F 17/30578 707/622 |
| 2013/0268567 | A1* | 10/2013 | Adjei-Banin | G06F 17/30563 707/812 |
| 2014/0074801 | A1* | 3/2014 | Kacher et al. | 707/692 |

\* cited by examiner

*Primary Examiner* — Mariela Reyes
*Assistant Examiner* — Courtney Harmon (57) ABSTRACT

An apparatus, computer-implemented method, and computer program are provided. In one embodiment, data is transferred from a database to a staging table in another database. The data is extracted from the staging table in order to transform the data, and the extracted data is transmitted to a database of another computing system.

14 Claims, 9 Drawing Sheets

APPARATUS AND METHOD FOR REPLICATING DATA

FIELD

The present invention relates to data replication and, more particularly, to a data replication process across two or more entities.

BACKGROUND

To replicate data, approaches such as Structured Query Language (SQL) replication and mirroring may be utilized. However, such approaches are generally not prudent when replicating data across two data centers due to the large amount of data. Thus, a replication process that can handle replicating large amounts of data may be beneficial.

SUMMARY

Certain embodiments of the present invention may provide solutions to the problems and needs in the art that have not yet been fully identified, appreciated, or solved by current replication systems. For example, one or more embodiments pertain to a replication process to replicate data across two data centers.

In one embodiment, a computer-implemented method is provided. The computer-implemented method includes transferring, by a computing system, data from a database to a staging table in another database. The computer-implemented method also includes extracting, by the computing system, the data from the staging table in order to transform the data, and transmitting, by the computing system, the extracted data to a database of another computing system.

In another embodiment, a computer program embodied on a non-transitory computer-readable medium is provided. The computer program is configured to cause at least one processor to transfer data from a database to a staging table in another database. The computer program is further configured to cause at least one processor to extract the data from the staging table in order to transform the data, and transmit the extracted data to a database of another computing system.

In yet another embodiment, an apparatus is provided. The apparatus includes at least one processor and memory including instructions. The instructions, with the at least one processor, are configured to cause the apparatus to transfer data from a database to a staging table in another database. The instructions, with the at least one processor, are further configured to cause the apparatus to extract the data from the staging table in order to transform the data, and transmit the extracted data to a database of another computing system.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

A data warehouse is a storage area for historical data with a database architecture structured in a certain way in some embodiments. The data stored in the warehouse may be uploaded from operational systems. The data warehouse may maintain data history, even if the source transaction systems do not, as well as integrates data from multiple source systems, enabling a central view across the enterprise. This benefit is generally valuable, but particularly so when the organization has grown by merger.

The data warehouse may also improve data quality by providing consistent codes and descriptions, and flagging or even fixing bad data. The data warehouse may further present the organization's information consistently, and provide a single common data model for all data of interest regardless of the data's source. The data warehouse may restructure the data so that it makes sense to the business users, as well as restructure the data so that it delivers excellent query performance, even for complex analytic queries, without impacting the operational systems.

The data warehouse may add value to operational business applications, notably customer relationship management (CRM) systems. The data warehouse may be configured to pull data from the operational system using a view created on a TeleVoxASP database called v_histtran. This view may be used to select the data that will eventually be extracted, transformed, and finally loaded in the final data warehouse.

Figure 1:
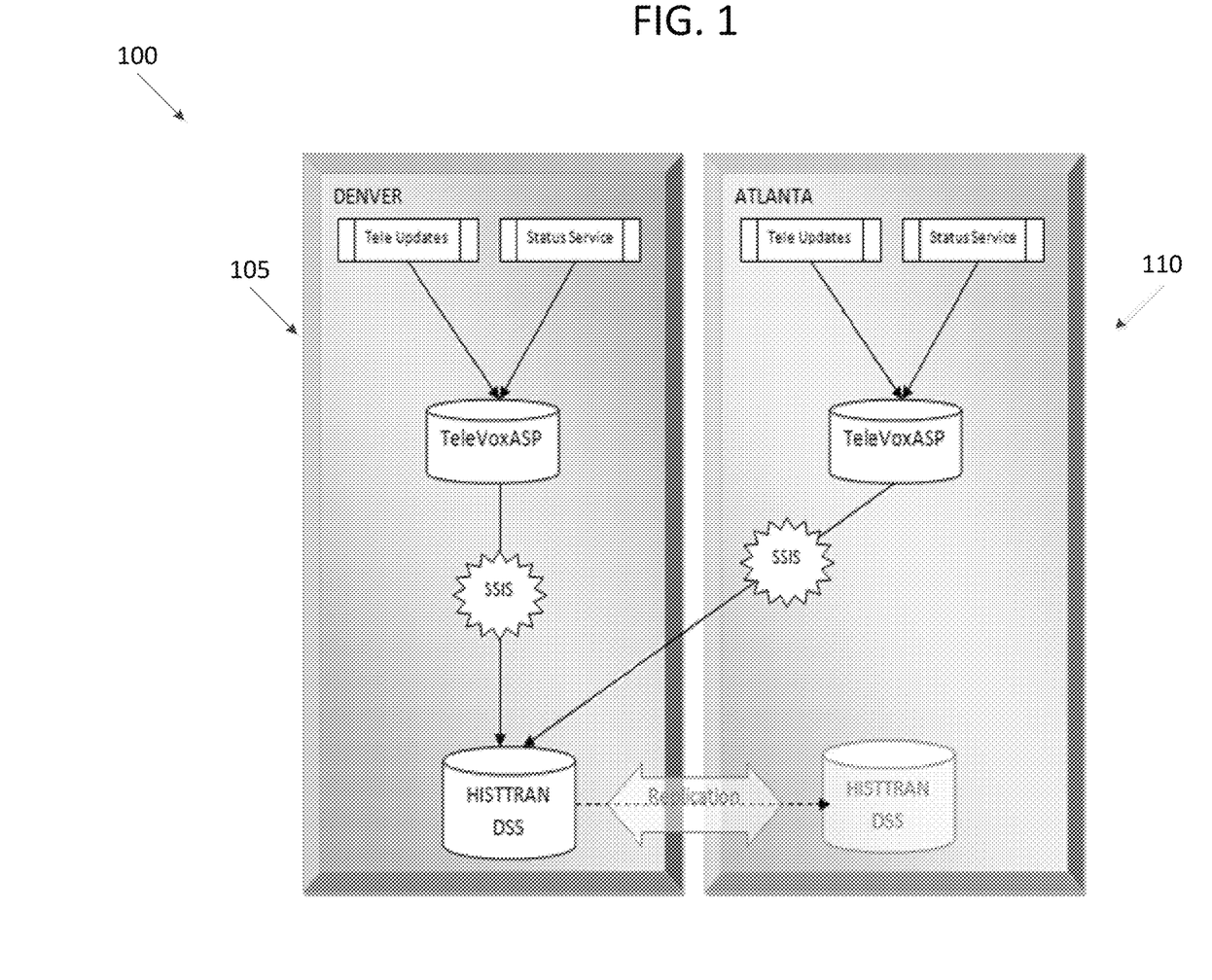
FIG. 1 is a diagram illustrating a data warehouse, according to an embodiment of the present invention.

FIG. 1 is a diagram 100 illustrating a data warehouse, according to an embodiment of the present invention. FIG. 1 shows a first location 105 and a second location 110 with data being replicated from first location 105 to second location 110. In this example, first location 105 may be Denver and second location 110 may be Atlanta. Each location may include a master package to determine whether jobs are available to process. It should be appreciated that the master package may utilize the following table when determining if jobs are available to process.

| Name | Data Type | Description |
| --- | --- | --- |
| ID | uniqueidentifier | Unique ID of each job |
| StartDate | datetime | The starting date range of records to pull from production from the view v_histtran |
| EndDate | datetime | The ending date range of records to pull from production from the view v_histtran |
| Completed | int | Status of job |
| Comments | nvarchar | Comments of job |
| Job Started | datetime | Date the job was started |
| JobEnded | datetime | Date the job ended |
| RowsTransfered | bigint | Number of rows transferred into Datawarehouse for particular job and date range |
| ErrorMessage | nvarchar | Error Message if job errored out |
| Is_Reprocess | bit | Bit column to check if job is a reprocess of a previous job. If 1 then reprocess, if 0 then not reprocess |
| Is_Local | tinyint | Bit column to check if job is a local job to that data center. 1 = Yes, 0 = No |
| Is_Processed | bit | Bit column to check if job has been picked up for process. 1 = Yes has been picked up, 0 = Not been picked up |
| Is_Finished | bit | Bit column to check if job has finished processing. 1 = Yes finished, 0 = No not finished |
| Cre_date | datetime | Date and time the job was created or record was inserted into the table |

Figure 2:
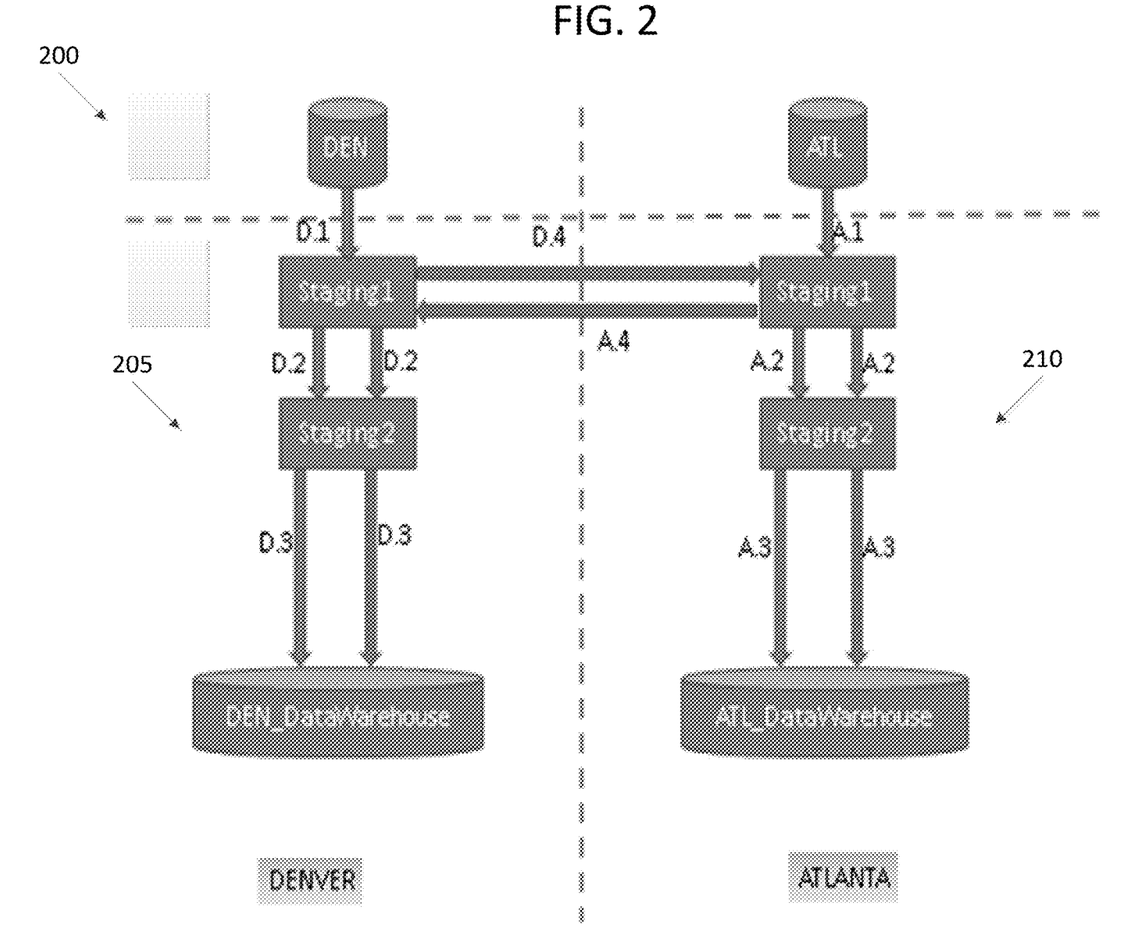
FIG. 2 is a diagram illustrating data transfer from a first location to a second location, according to an embodiment of the present invention.

FIG. 2 is a diagram 200 illustrating data transfer from a first location 205 to a second location 210, according to an embodiment of the present invention. The following table provides information to the diagram.

| Legend | Name of Package |
| --- | --- |
| D.1 | DEN_LOADING STAGING_1 |
| D.2 | DEN_LOADING PRODUCTION TO STAGING |
| D.3 | LOADING STAGING TO DSS_DEN |
| D.4 | TRANSFER TO ATL |
| A.1 | ATL_LOADING STAGING_1 |
| A.2 | ATL_LOADING PRODUCTION TO STAGING |
| A.3 | LOADING STAGING TO DSS_ATL |
| A.4 | TRANSFER TO DEN |

It should be appreciated that each package shown above may be controlled by the master package. In this example, the master package in the Denver data center is called DEN_MASTER PACKAGE and the master package in the Atlanta data center is called ATL_MASTER PACKAGE.

Den_Loading Staging_1

Figure 5:
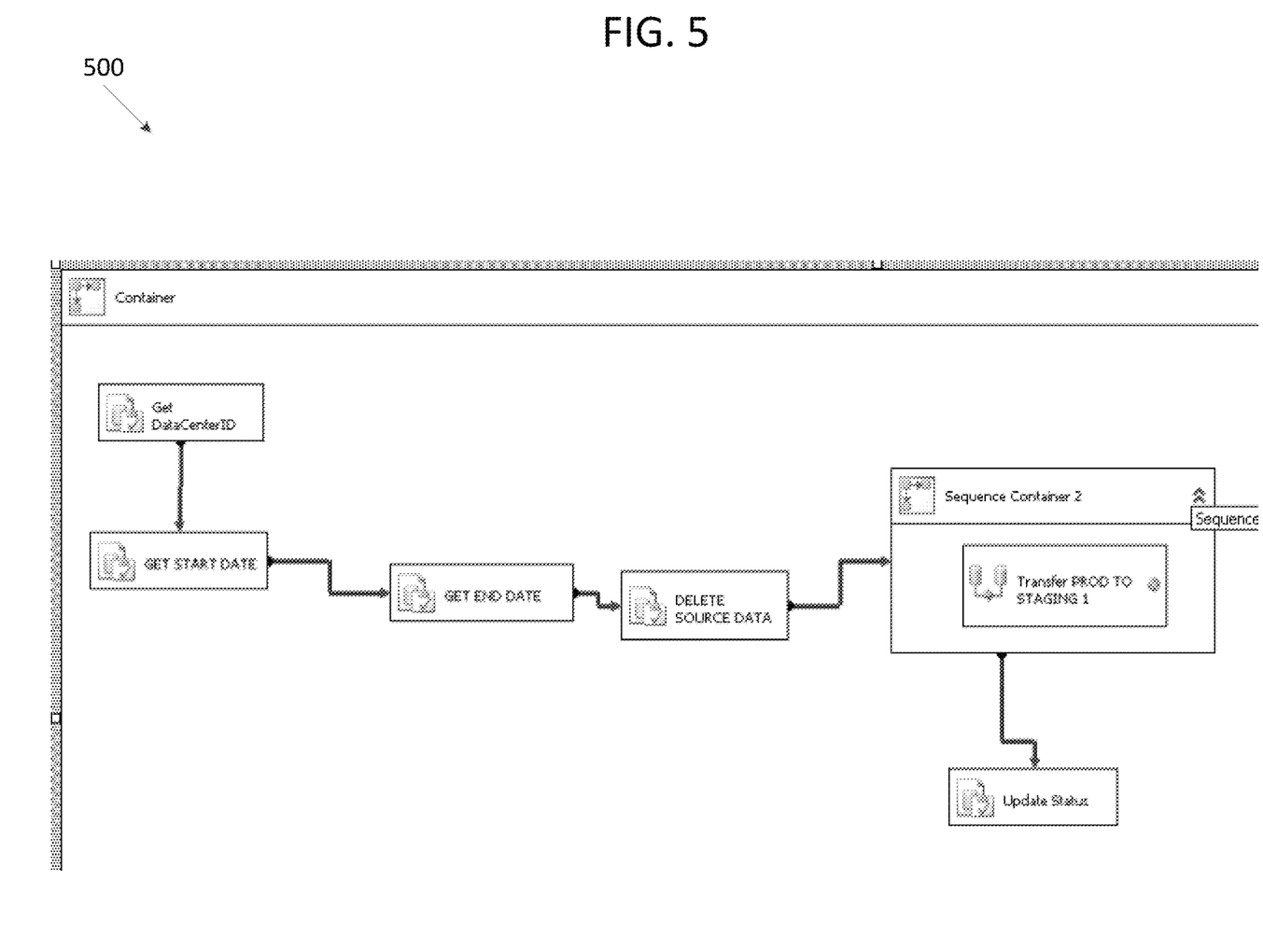
FIG. 5 is a flow diagram illustrating a process for load staging, according to an embodiment of the present invention.

In this embodiment, data is transferred from the Denver TeleVoxASP database into the Staging 1 table in the Archive_Housecalls database. See, for example, FIG. 5. It should be noted that there are no data transformations occurring in this embodiment. Stated differently, this is a simple bulk transfer of data from the TeleVoxASP database to the Archive_Housecalls.

Den_Loading Production to Staging

In this embodiment, data is extracted from the Staging_1_histtran table and transformations occur. See, for example, FIG. 6. This embodiment may be broken into two sections. In the first section, a check is performed to determine whether the dimension exists in the dimension tables and, if the dimension exists, a dimension key is returned. If the dimension does not exist in the dimension table, a new dimension is inserted into the dimension table and the new dimension key of the record that was just inserted is returned.

Figure 6:
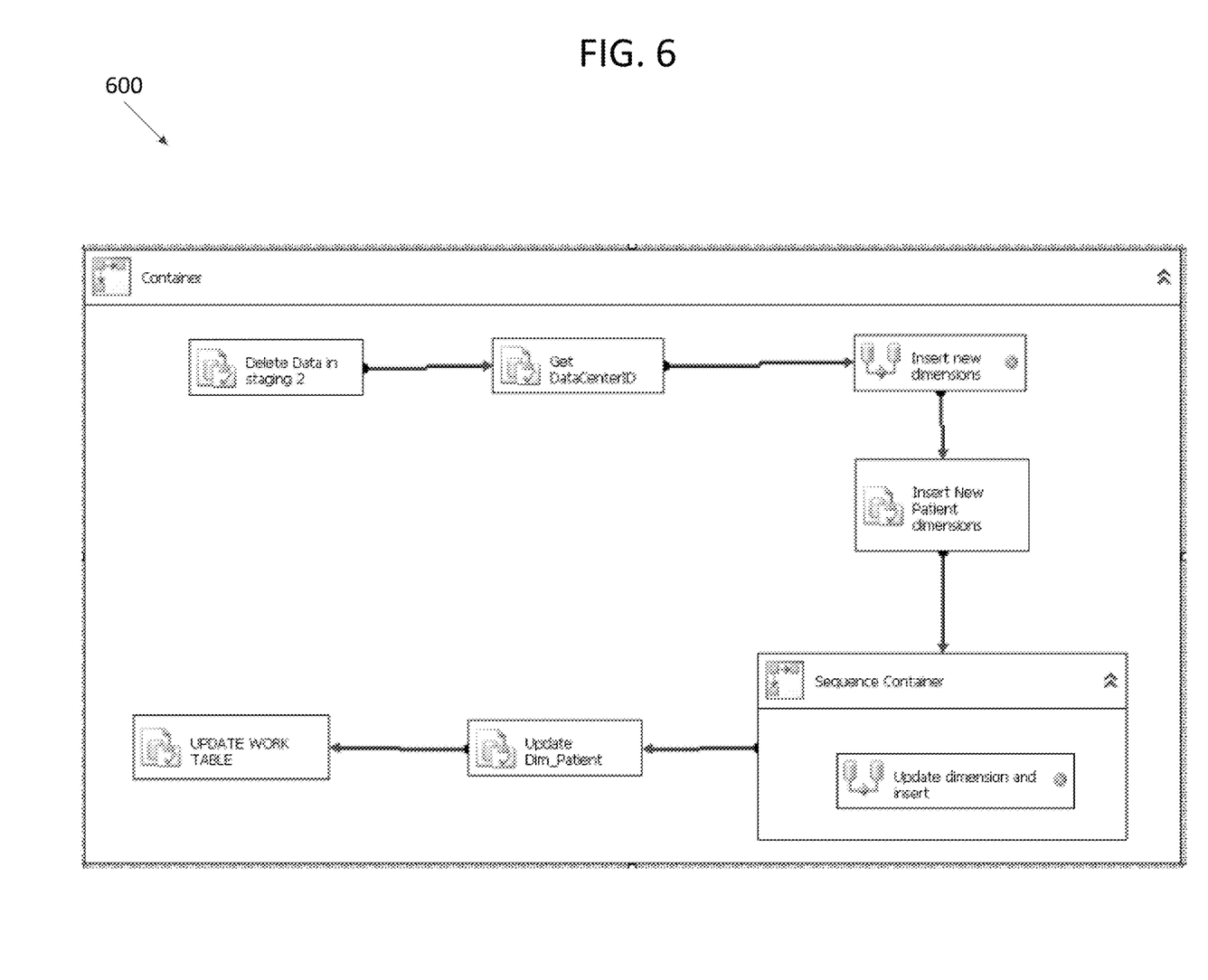
FIG. 6 is a flow diagram illustrating a process for loading production to staging, according to an embodiment of the present invention.

To insert new dimensions, a lookup is performed on the dimension table to determine whether a dimension exists. If no dimension exists, the records are aggregated to speed up the process. Each new dimension record is passed through the stored procedure to be inserted into the dimension table.

Next, the data flow task called Update Dimension and Insert is described in further detail below. Here, the records from the staging_1_histtran table are passed through the data flow task. For each record, the corresponding dimension records are found from the dimension tables. Records that cause errors are outputted as shown above to the Histtran_ErrorRecords table with a description of the error.

In this embodiment, a duplication key is also created. The duplication key may be appended to the end of the record, and may be a combination of records. The duplication key may be unique to each record and may be used to match with a fact table to remove duplicate records.

Loading Staging to Dss_Den

Figure 7:
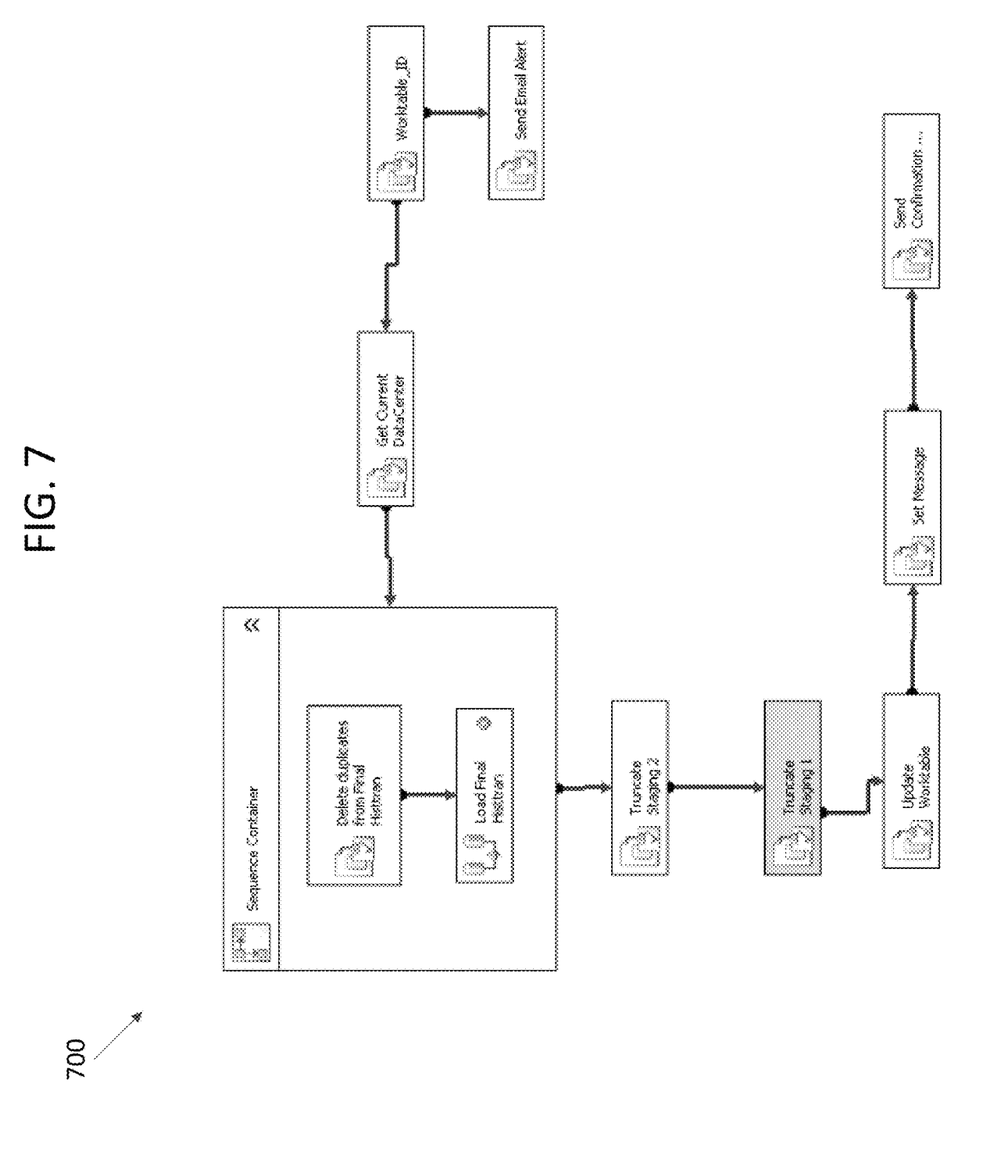
FIG. 7 is a flow diagram illustrating a process for load staging, according to an embodiment of the present invention.

In this embodiment, the following tasks may be performed: (1) a check for duplicate records, (2) duplicate records, if found, are deleted from the fact table, (3) the worktable is updated, and (4) an email is sent confirming that the job was completed successfully. See, for example, FIG. 7.

Transfer to ATL

Figure 8:
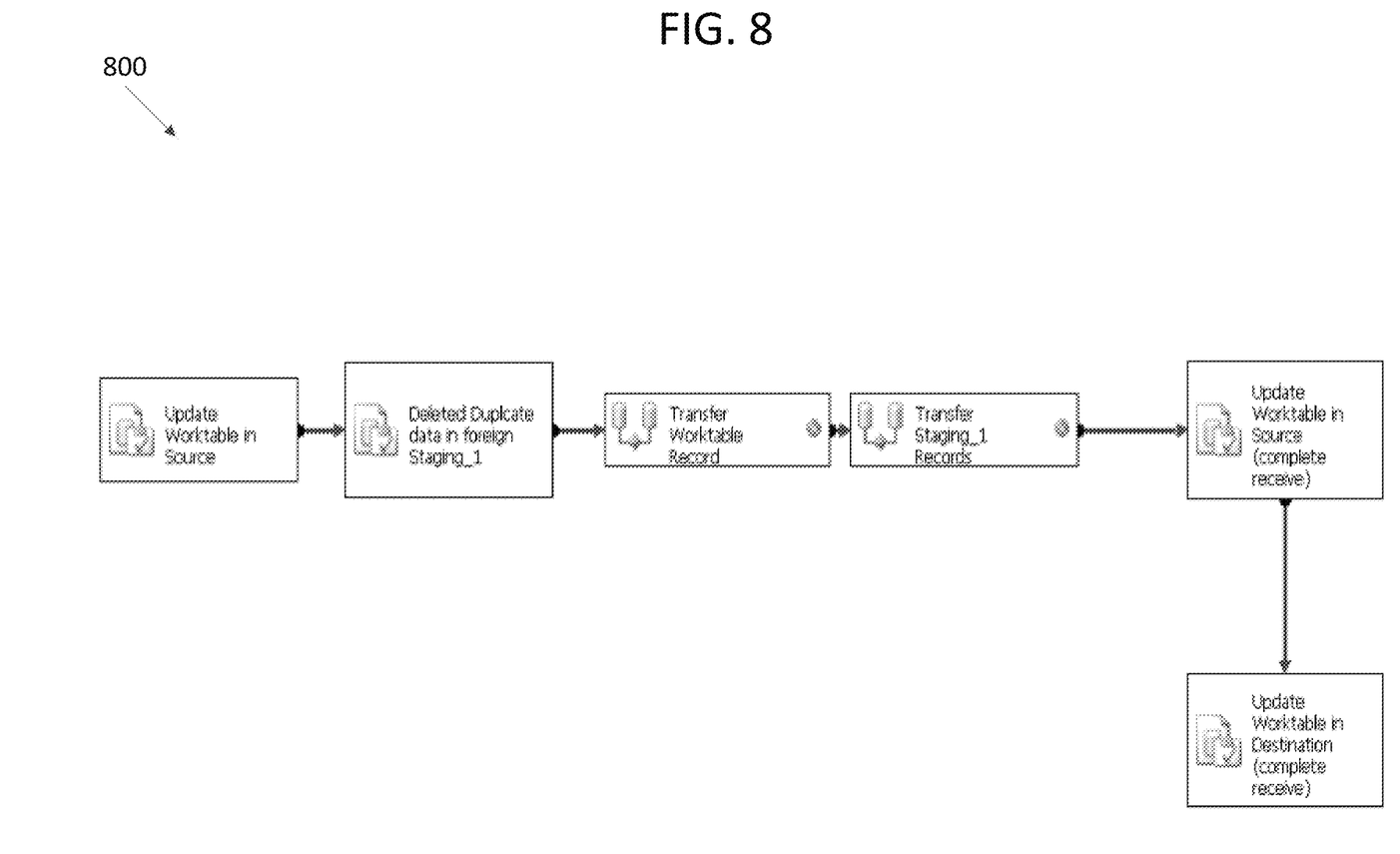
FIG. 8 a flow diagram illustrating a process for transferring data, according to an embodiment of the present invention.

In this embodiment, the following tasks may be performed: (1) update the worktable job record on the status of the job, (2) delete duplicate records in the staging_1 tables, (3) transfer the worktable record to the opposite data center worktable, (4) transfer the raw data from staging_1 histtran table from one data center to the opposite data center, and (5) update the worktable job record to indicate that the records have been successfully transferred and waiting to be processed by the opposite data center. See, for example, FIG. 8.

Figure 3:
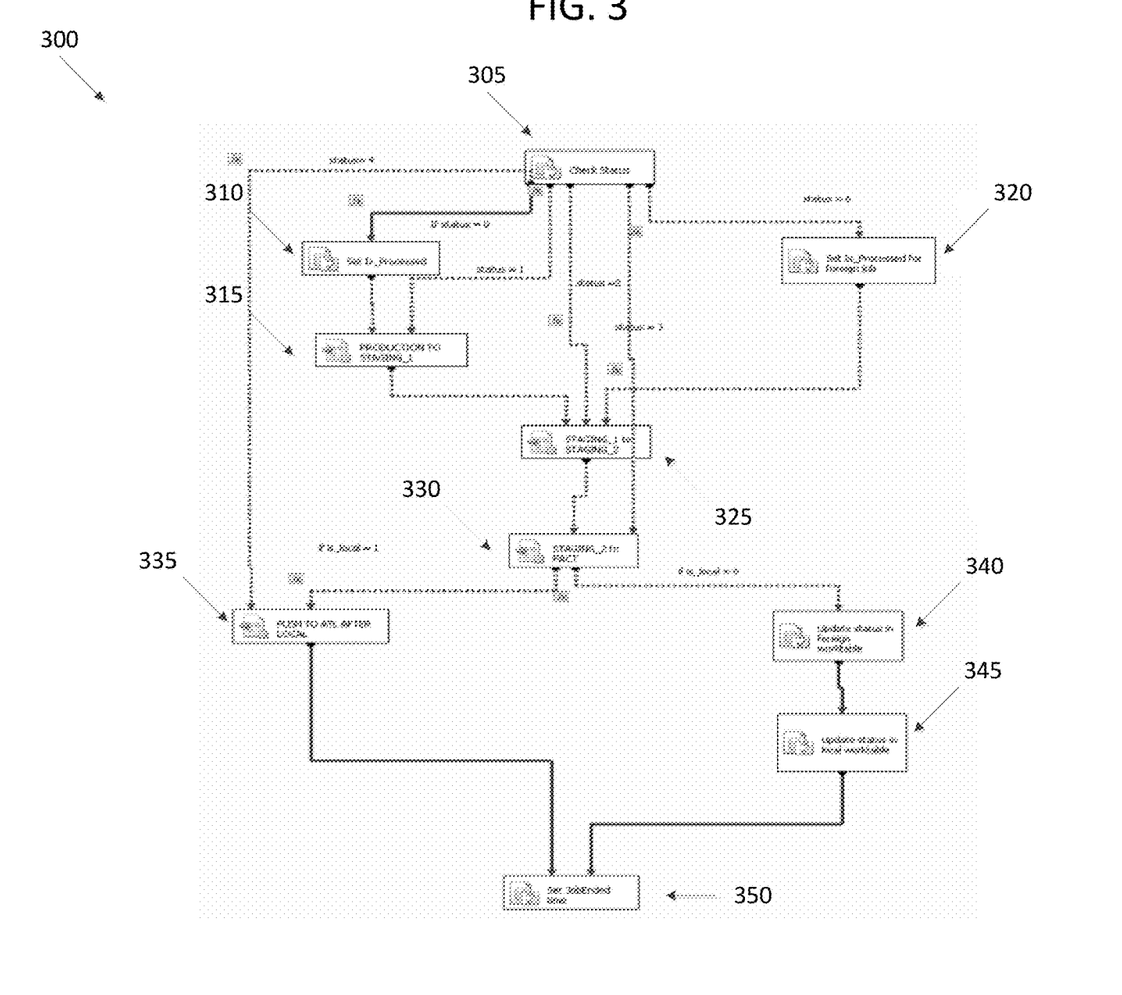
FIG. 3 is a flow diagram illustrating a process executed by the master package, according to an embodiment of the present invention.

FIG. 3 is a flow diagram 300 illustrating a process executed by the master package, according to an embodiment of the present invention.

At 305, the master package may check the status of the job. When the status is 0, the master package moves to 310 and processes the job (e.g., "Set Is_Processed"). In certain embodiments, the master package checks a worktable. This worktable may include records. Each record pertains to a single job containing the parameters of the work to be done such as the date ranges. There may also be a column called IsCompleted and IsStarted. These columns are checked to determine whether the particular job has been started or completed. The master package may check the worktable for the latest job where the IsStarted field=0 and Status field=0. The SSIS package immediately populates the JobStarted field and changes the Status field to 1 and IsStarted field=1. This ensures that the job had been started and marked so that the job is not repeated.

When the status is 1, the master package at 315 moves to staging_1 (e.g., "Production to Staging_1"). In certain embodiments, there may be two (2) staging tables to stage the data before loading into the final data warehouse—Staging_1 and Staging_2. To minimize impact on the transactional and operational database system, the data may be loaded quickly into Staging_1 table.

When the status is 6, the master package at 320 moves to processing the foreign job (e.g., "Set Is_Processed for Foreign Job"). In some embodiments, there are staging tables in both datacenters. Each staging table sends its data across to the other staging table to another datacenter. This data being sent over to the other datacenter is known as the foreign data. The job record worktable may also be sent to the foreign datacenter. Once a job record is inserted into the foreign worktable and the data is transferred to the foreign worktable, the master package may pick up that job.

By rule, the master package will only process all local jobs first before processing foreign jobs. After all of the local work is recorded locally to its datacenter, the master package may start to process the foreign jobs. The foreign worktable records can be identified by a column called Is_Local. If this field is 1, then the job is a job local to the datacenter, and if Is_Local=0, then the job is a foreign job. The master package may pick up any jobs with a Status=6, which is also indicative of a foreign job.

When the status is 2, the master package at 325 moves to staging 2 (e.g., Staging_1 to Staging_2). The master package, in certain embodiments, may take the data from Staging_1 and transforms the data to conform to the standard of the final destination fact table. In order to perform such a function, each record is individually processed. Once each record is processed correctly, the record is inserted into Staging_2.

When the status is 3, the master package at 330 moves from Staging_2 to Fact. Once the data transfer in Staging_2 is complete, the data is ready to move to the final fact table. It should be appreciated that records that are needed and conform to the standards of the fact table are moved into the fact table. At this point, the work table record that is associated with this set of data is updated to indicate that the transfer into the fact table is complete, by updating the Status field to 3.

When the status is 4, or if is_local=1 after step 330, the master package at 335 pushes the data to the data center of the second location (e.g., "PUSH TO ATL AFTER LOCAL"). When the status is 4, the package pushes the data to the foreign datacenter.

At 340, the master package updates the status in the foreign worktable if is_local=0. Is_Local=0 in the worktable record identifies that the work record is from a foreign datacenter.

At 350, the master package indicates that the job has ended and sets the time (e.g., Set Job Ended time). Once the package has completed migrating the data into its own data warehouse and the foreign datacenter has completed migrating this data into its datacenter, the master package may change the status of the job to 8 and set the JobEnded field to the current time.

Figure 4:
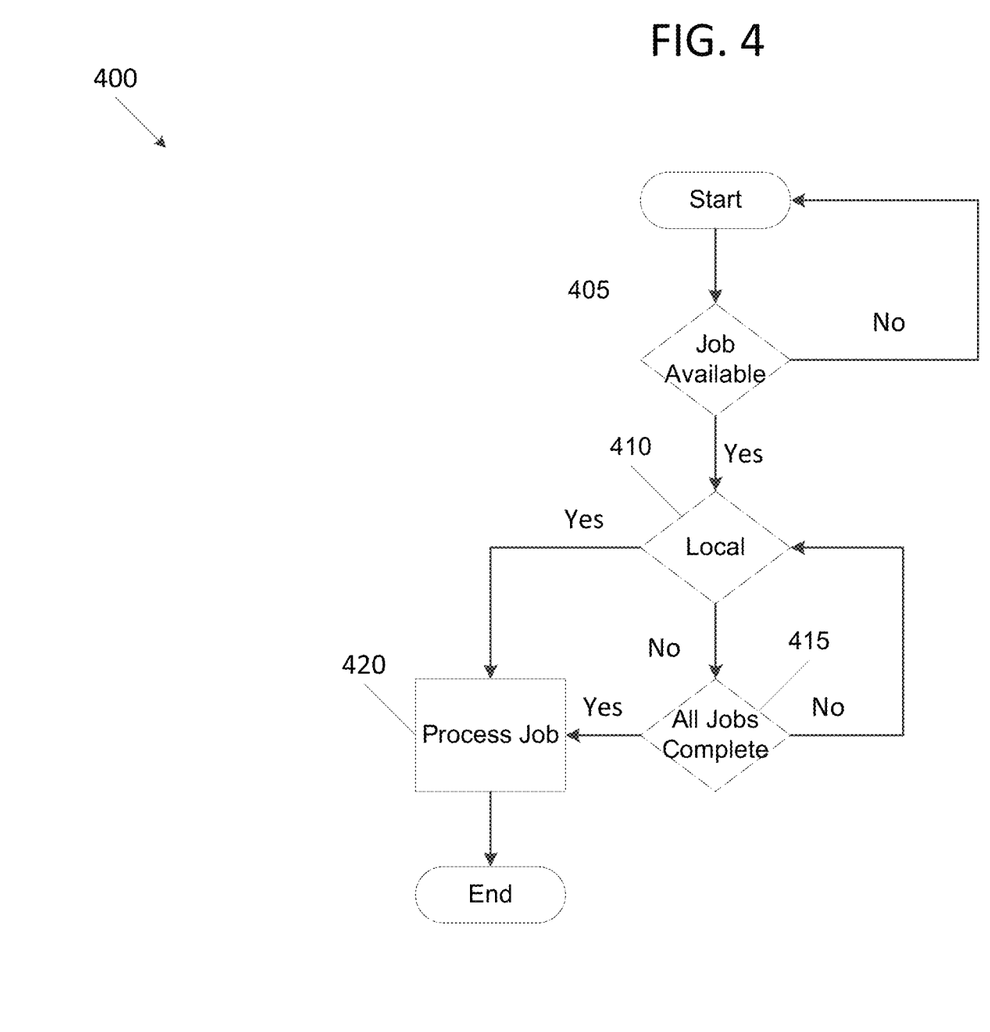
FIG. 4 is a flow diagram illustrating a process for checking the status, according to an embodiment of the present invention.

FIG. 4 is a flow diagram 400 illustrating a process for checking the status, according to an embodiment of the present invention. The status of the job may be decided by executing a stored procedure, such as p_Histtran_CheckStatus_DEN in Denver (e.g., first location) and p_Histtran_CheckStatus_DEN in Atlanta (e.g., second location).

At 405, the master package determines whether a job is available in the worktable. If no job is currently available, the master package routinely periodically determines whether a job is available in the worktable. If a job is available, the master package at 410 determines whether the available job is a local job to the data center.

If the job is local to the data center, the master package at 420 processes the job. If the job is not local to the data center, the master package at 415 determines whether all local jobs have been completed. If not, the master package returns to step 410. Otherwise, the master job continues to step 420 to process the job.

It should be appreciated that, in this embodiment, the master package may be executed using a SQL job. The SQL job may run every minute between a specified start and end time, or may run at any predefined time period. The job may run outside of a calling window and the master package may call the child packages depending on the criteria of the job.

The process steps shown in FIGS. 3 and 4 may be performed, in part, by a computer program, encoding instructions for a nonlinear adaptive processor to cause at least the processes described in FIGS. 3 and 4 to be performed by the apparatuses discussed herein. The computer program may be embodied on a non-transitory computer readable medium. The computer readable medium may be, but is not limited to, a hard disk drive, a flash device, a random access memory, a tape, or any other such medium used to store data. The computer program may include encoded instructions for controlling the nonlinear adaptive processor to implement the process described in FIGS. 3 and 4, which may also be stored on the computer readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an application specific integrated circuit ("ASIC").

Figure 9:
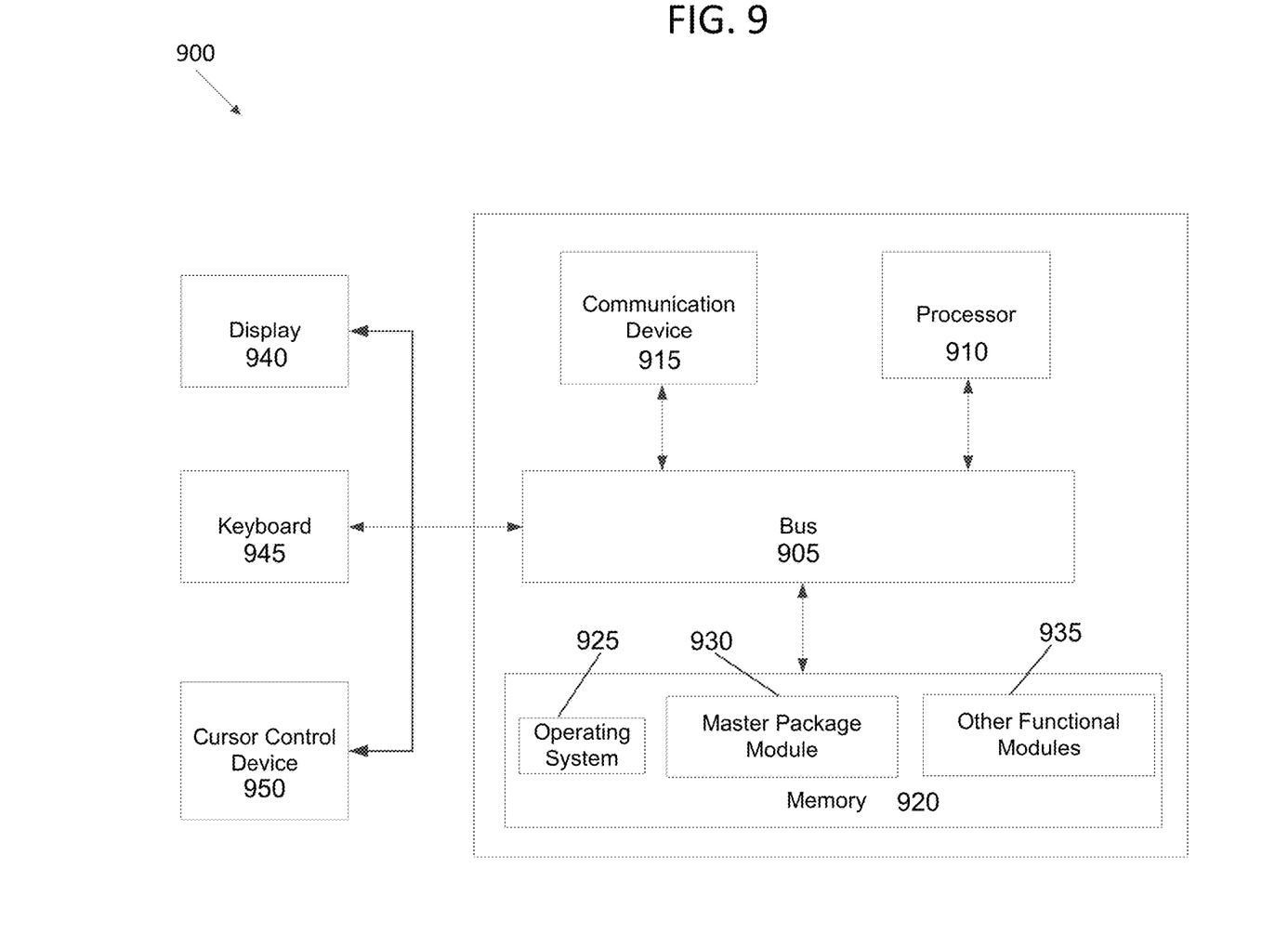
FIG. 9 is a block diagram illustrating a computing system, according to an embodiment of the present invention

FIG. 9 is a block diagram 900 illustrating a computing system, according to an embodiment of the present invention. System 900 may include a bus 905 or other communication mechanism that can communicate information and a processor 910, coupled to bus 905, that can process information. Processor 910 can be any type of general or specific purpose processor. System 900 may also include memory 920 that can store information and instructions to be executed by processor 910. Memory 920 can be comprised of any combination of random access memory ("RAM"), read only memory ("ROM"), static storage such as a magnetic or optical disk, or any other type of computer readable medium. System 900 may also include a communication device 915, such as a network interface card, that may provide access to a network.

The computer readable medium may be any available media that can be accessed by processor 910. The computer readable medium may include both volatile and nonvolatile medium, removable and non-removable media, and communication media. The communication media may include computer readable instructions, data structures, program modules, or other data and may include any information delivery media.

Processor 910 can also be coupled via bus 905 to a display 940, such as a Liquid Crystal Display ("LCD"). Display 940 may display information to a user. A keyboard 945 and a cursor control unit 950, such as a computer mouse, may also be coupled to bus 905 to enable the user to interface with system 900.

According to one embodiment, memory 920 may store software modules that may provide functionality when executed by processor 910. The modules can include an operating system 925 and a master package module 930, as well as other functional modules 935. Operating system 925 may provide operating system functionality for system 900. Because system 900 may be part of a larger system, system 900 may include one or more additional functional modules 935 to include the additional functionality.

One skilled in the art will appreciate that a "system" could be embodied as a personal computer, a server, a console, a personal digital assistant (PDA), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Embodiments discussed herein pertain to data warehouse replication system. In some embodiments, data is transferred from a database to a staging table in another database. The data is extracted from the staging table in order to transform the data, and finally the extracted data is transmitted to a database of another computing system.

It will be readily understood that the components of the invention, as generally described and illustrated in the figures herein, may be arranged and designed in a wide variety of different configurations. Thus, the detailed description of the embodiments is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with an embodiment may be included in at least one embodiment of the invention. Thus, appearances of the phrases "in certain embodiments," "in some embodiments," "in other embodiments," or other similar language, throughout this specification do not necessarily all refer to the same embodiment or group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method, comprising:
    transferring, by a computing system, data from a database to a staging table in another database;
    extracting, by the computing system, the data from the staging table to transform the data and moving the extracted data to another staging table after transformation, wherein the extracting of the data comprises determining whether dimensions exist in the staging table in order to receive a dimension key or a new dimension key, returning the dimension key when the dimensions exist, and inserting the new dimension key into a dimension table when the dimensions do not exist and returning the new dimension key; and
    transmitting, by the computing system, the extracted data to a database of another computing system;
    wherein duplicate records are prevented from being created by:
        performing, by the computing system, a check for duplicated records; and
        deleting, by the computing system, duplicated records from the staging table.

2. The computer-implemented method of claim 1, wherein the determining of whether the dimensions exist comprises:
    creating, by the computing system, a duplication key to prevent duplicate records from being created.

3. The computer-implemented method of claim 1, further comprising:
    updating, by the computing system, a worktable record to indicate that the data has been successfully transferred.

4. The computer-implemented method of claim 1, further comprising:
    determining, by the computing system, a status of a job prior to processing the data; and
    determining, by the computing system, whether the job is a local job.

5. The computer-implemented method of claim 4, further comprising:
    processing, by the computing system, the job when the job is a local job.

6. A computer program embodied on a non-transitory computer-readable medium, the computer program configured to cause at least one processor to:
    transfer data from a database to a staging table in another database;
    extract the data from the staging table to transform the data and move the extracted data to another staging table after transformation, wherein the extraction of the data comprises determining whether dimensions exist in the staging table in order to receive a dimension key or a new dimension key, returning the dimension key when the dimensions exist, and inserting the new dimension key into a dimension table when the dimensions do not exist and returning the new dimension key; and transmit the extracted data to a database of another computing system;

wherein duplicate records are prevented from being created by:

performing, by the computing system, a check for duplicated records; and deleting, by the computing system, duplicated records from the staging table.

7. The computer program of claim 6, wherein the computer program is further configured to cause the at least one processor to:

create a duplication key to prevent duplicate records from being created.

8. The computer program of claim 6, wherein the computer program is further configured to cause the at least one processor to:

update a worktable record to indicate that the data has been successfully transferred.

9. The computer program of claim 6, wherein the computer program is further configured to cause the at least one processor to:

determine a status of a job prior to processing the data; and determine whether the job is a local job.

10. The computer program of claim 9, wherein the computer program is further configured to cause the at least one processor to:

process the job when the job is a local job.

11. An apparatus, comprising:

at least one processor; and memory comprising instructions, wherein the instructions, together with the at least one processor, are configured to cause the apparatus to:

transfer data from a database to a staging table in another database, extract the data from the staging table to transform the data and move the extracted data to another staging table after transformation, wherein the extraction of the data comprises determining whether dimensions exist in the staging table in order to receive a dimension key or a new dimension key, returning the dimension key when the dimensions exist, and inserting the new dimension key into a dimension table when the dimensions do not exist and returning the new dimension key, and transmit the extracted data to a database of another computing system;

wherein duplicate records are prevented from being created by:

performing, by the computing system, a check for duplicated records; and deleting, by the computing system, duplicated records from the staging table.

12. The apparatus of claim 11, wherein instructions, together with the at least one processor, are further configured to cause the apparatus to:

create a duplication key to prevent duplicate records from being created.

13. The apparatus of claim 11, wherein instructions, together with the at least one processor, are further configured to cause the apparatus to:

update a worktable record to indicate that the data has been successfully transferred.

14. The apparatus of claim 11, wherein instructions, together with the at least one processor, are further configured to cause the apparatus to:

determine a status of a job prior to processing the data;

determine whether the job is a local job; and process the job when the job is a local job.

* * * * *